Oct. 19, 1937.  A. F. PAVILLON  2,096,260
DEVICE DAMPING THE DISTURBANCES PROPAGATED IN FLUID
Original Filed Oct. 12, 1932   3 Sheets-Sheet 1
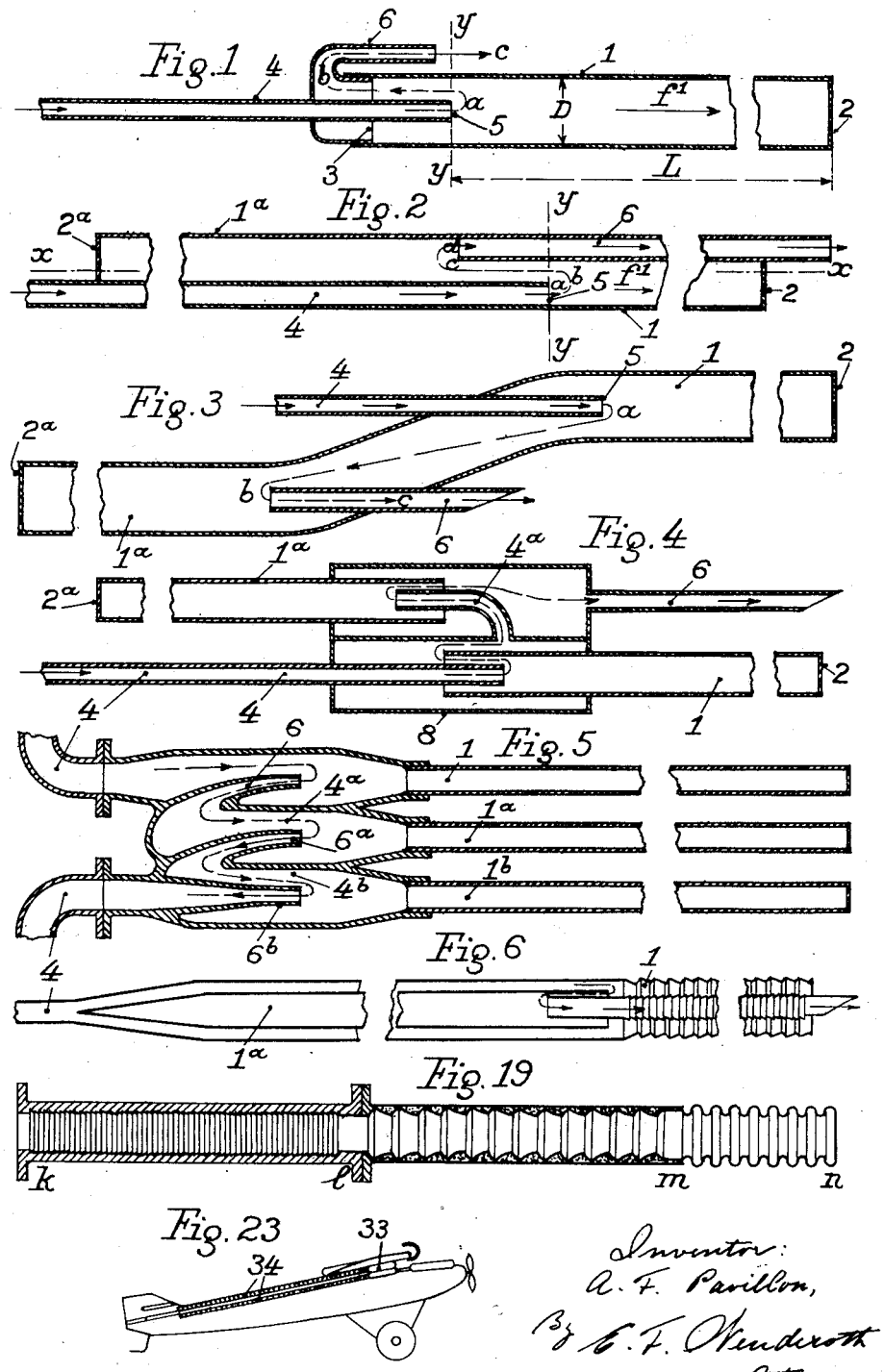

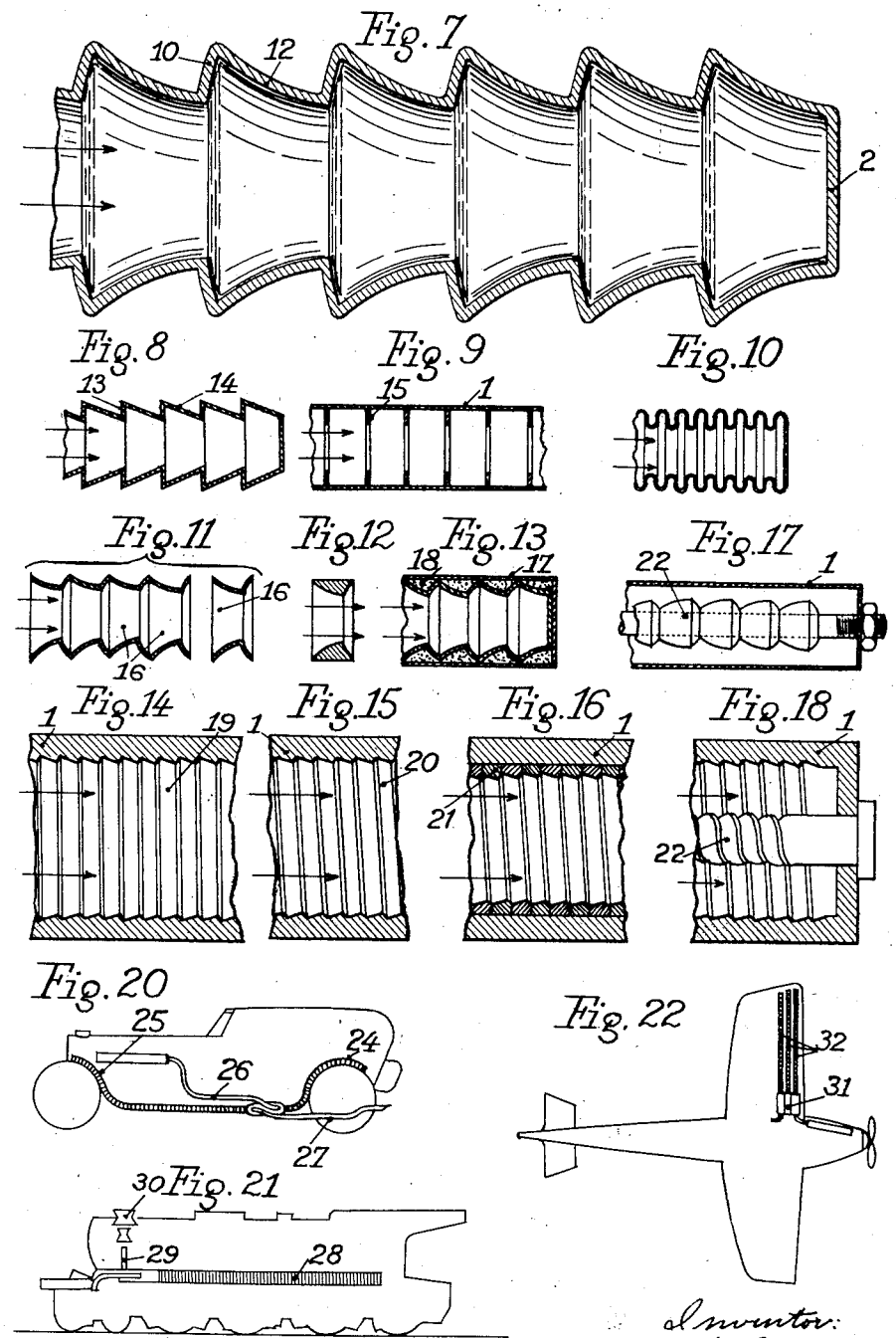

Oct. 19, 1937.    A. F. PAVILLON    2,096,260
DEVICE DAMPING THE DISTURBANCES PROPAGATED IN FLUID
Original Filed Oct. 12, 1932    3 Sheets—Sheet 3
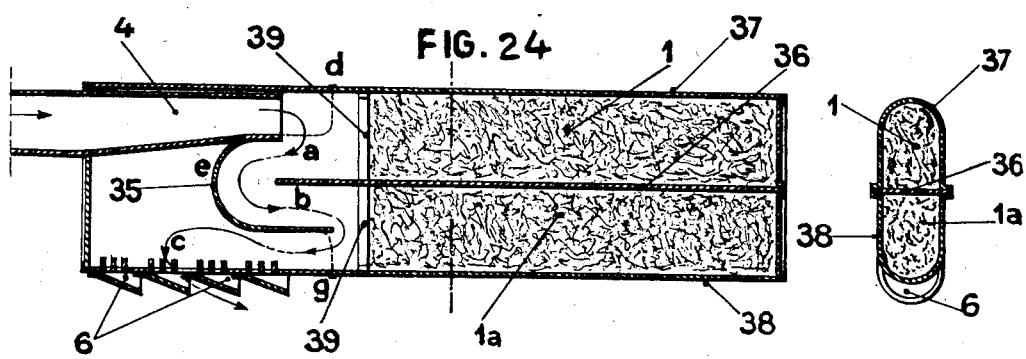
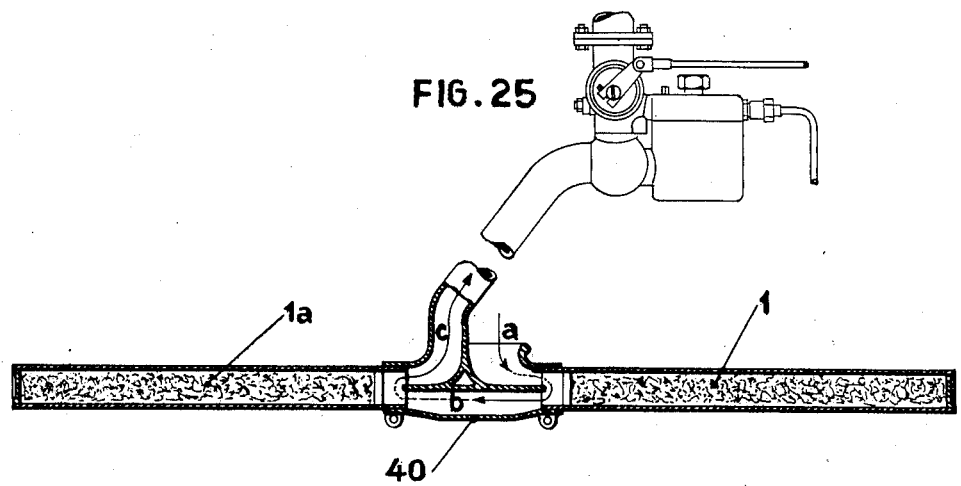
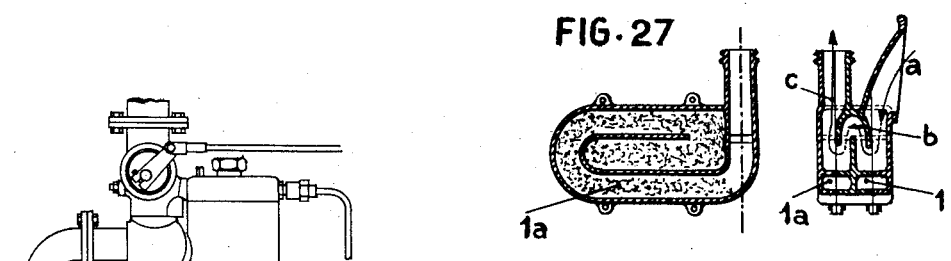
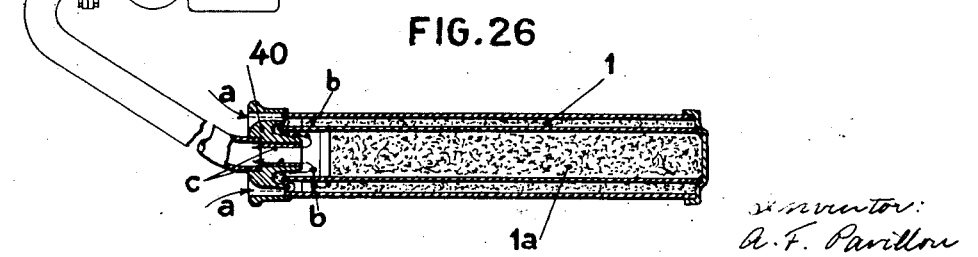

Patented Oct. 19, 1937

2,096,260

UNITED STATES PATENT OFFICE 2,096,260

DEVICE DAMPING THE DISTURBANCES PROPAGATED IN FLUID

André Francois Pavillon, Asnieres (Seine) France

Application October 12, 1932, Serial No. 637,539. Renewed September 10, 1937. In France October 22, 1931

7 Claims. (Cl. 181—53)

It is an ascertained fact that in most explosion or internal combustion reciprocating engines, and as a general rule in all apparatuses which utilize the expansion of a fluid (steam engines, pneumatic tools, etc.), the chamber within which the fluid is enclosed after it has performed its work of expansion is suddenly placed in communication with the outer atmosphere by means of a pipe called the exhaust pipe. This operation gives rise to disturbance (a layer of compressed fluid) which is propagated up to the extremity of the exhaust pipe where it passes into the atmosphere and gives rise to the exhaust noise.

Disturbances, similar in nature, also occur in the suction inlet piping of motors, compressors, and more generally speaking in all apparatuses which utilize moving fluids, either due to the operation of valves or to sudden modifications of the work effected by the said fluids.

Numerous devices have already been employed to diminish these noises, but these devices either do not suppress the noise sufficiently or else have the drawback of setting up back pressure or counter depression which appreciably diminish the efficiency of the motor or other apparatus.

On the other hand one finds that the propagation of the disturbance occurs in the fluid in a manner similar to that of sound waves, that is to say along a straight line and with same speed as sound in a similar medium, independently of the movement of the fluid itself, and that it is reflected by the surfaces which stand in its path.

The object of the present invention is a device for damping the propagation of disturbances in fluids contained in the ducts and which may be employed, in particular, as a silencing exhaust pipe for explosion or internal combustion engines or as an inlet silencer on machines of any kind, said device being based on the aforementioned observations and providing perfect damping of the disturbances without setting up any back-pressure or counter depression.

This device is unique owing to the fact that it comprises one or more damping tubes which are of comparatively considerable length and are closed at one of their extremities and are provided at the other extremity into which the pipe feeding the fluid opens, with orifices, ducts or canals which act as separators, positioned in proximity to the open end of said pipe and disposed in such a manner as to cause sudden changes or reversals of direction of the path of the fluid, ensuring the evacuation of said fluid from the tube.

In the attached drawings which are provided solely as an example:

Figure 1 is a diagrammatical longitudinal section, of a device according to the invention;

Figure 2 is a diagrammatical longitudinal section of an apparatus comprising two of the devices mounted in series;

Figure 3 is a longitudinal section of a two stage alternative arrangement;

Figure 4 is a section of a two stage alternative arrangement;

Figure 5 is a section of a three stage alternative arrangement;

Figure 6 is a longitudinal section of another two stage alternative arrangement;

Figures 7 to 18 represent various units capable of being used for the erection of the tubes;

Figure 19 is a representation of a tube made up of several of the aforementioned units;

Figures 20, 21, 22 and 23 are diagrammatical representations of various applications of the device made according to the invention to motors;

Figure 24 is a view in section according to its median plane and in cross section of a form of an exhaust silencer for an automobile car;

Figure 25 is a longitudinal section showing a form of an inlet silencer made according to the invention;

Figure 26 also in longitudinal section, shows another application of an inlet silencer;

Figure 27 is an example, in longitudinal section and in cross section along the axis of the air inlet piping, of a third embodiment of a similar silencer.

According to the set up shown as an example in Figure 1, the apparatus comprises a tube I circular in section, or of any other section, closed at its extremity 2. The pipe 4 through which passes the fluid, the exhaust pipe of an engine for instance, opens into this tube I at a point opposite the extremity 2 and preferably parallel to its longitudinal axis. The extremity 5 of duct 4, through which the fluid exits, is positioned at a comparatively large distance L from extremity 2. In order to make the idea clear it might be pointed out that this distance L is, for instance, in the neighbourhood of ten times diameter D of tube I. The extremity 3 of tube I is connected to an outlet duct 6.

With a contrivance of this sort the fluid exits into the atmosphere by passing from duct 4 to duct 6 along a sinuous path a—b—c. On the contrary, the disturbance emerging from duct 4, and divorced from the fluid, is propagated along a straight line in tube I in the direction of arrow $f^1$, and is then reflected against extremity 2 and returns in the opposite direction. While travelling along this path the disturbance becomes damped by friction and numerous reflections against bottom 2, on the lateral walls of the tube, and in the finely divided substance with which said tube may be filled. It will be noted that as the escape of the fluid occurs along path $a$—$b$—$c$, which is short and absolutely free the device does not set up any appreciable back pressure in pipe 4. Owing to the sinuous nature of this path, which moreover results in changes or reversals of the direction of flow, the disturbing surge has no tendency to follow the path of the fluid; indeed it frees itself from the latter and follows the channels which lead it towards the outlet, and which, for this reason, constitute the separating element of the apparatus.

The damping effect is greater in accordance with increase in length of the tube 1.

Moreover, if it is necessary, it is possible to have one, two or more similar devices, positioned in series, and similar to the device described.

In Figures 2, 3, a damper composed of two tubes 1 and 1$^a$ disposed in opposite directions and in reality forming one single tube, is shown. In the example shown in Figure 2 the fluid inlet and evacuation tubes 4 and 6 are positioned within the damping tube, whereas they are positioned exteriorly thereof in Figure 3.

Figure 4 shows another arrangement of two independent tubes 1 and 1$^a$ fixed on a central box 8.

Figure 5 represents an embodiment comprising three parallel tubes 1, 1$^a$, 1$^b$.

Figure 6 is a representation of a two stage apparatus in which all the units are mounted about a common axis in such manner as to impart to outer line of the apparatus a cylindrical shape. The gases follow the path indicated by the arrows, whereas the disturbances are deadened in dampers 1 and 1$^a$.

The form of embodiment of an exhaust silencer for an automobile shown in Figure 24 is particularly economical and efficient in its arrangement.

In this apparatus the separating unit and the damping device are welded together along line $d$—$e$—$g$, a suitably curved sheet metal baffle 35, being inserted between the welded units. Damper 1, 1$^a$ is made up of a medial metal plate 36 to which are welded two half shells 37 and 38. The input of the gases is through pipe 4 and said gases, after having followed sinuous path $a$—$b$—$c$, escape into the atmosphere through vents 6. The damping of the disturbances is effected in steel-wool with which tubes 1 and 1$^a$ are provided along a certain portion of their length, as shown in the drawings, said steel wool being kept in position by suitable means such as stays 39 placed on edge.

Naturally the aforementioned contrivances are reversible in the sense that the fluid to be evacuated may be introduced into the device by duct 6 and ejected through duct 4.

The results obtained can be improved by providing damping tubes 1 and 1$^a$ with protruding portions on which the disturbances will impinge and be reflected so that they will flatten themselves a number of times.

Figure 7 shows a form of embodiment in which tube 1 is provided with surface units 10 approximately perpendicular to the axis, and interconnected by flared units 12. A tube having such shape will permit disturbances travelling in the direction of the arrows to pass freely, whereas it damps and flattens out disturbances proceeding in the opposite direction because each unit 10, perpendicular to the axis, reflects a portion of the incident disturbance rearwardly. Consequently if a disturbance be directed towards the entrance to the tube and in the direction of the arrows, it travels along the tube as far as its closed extremity 2 from whence it is reflected. But on its return journey the disturbance is damped and spread out by multiple reflection on the surface units 10 perpendicular to the direction of its movement. The damping effect is roughly proportional to the length of the damping tube.

The section of the wall may be different. Thus in the example shown in Figure 8 the units perpendicular to the axis are constituted by plain flat rings 13 and the flared units by regular truncated cones 14. It is also possible to employ a series of flat diaphragms 15 (Figure 9) or a corrugated section (Figure 10).

Tube 1 may be made in one piece by shaping a cylindrical tube, by casting, by electro-plating etc., or by juxtapositioning two units such as 16 (Figure 11). These units can be obtained by punching, by stamping, by turning or in any other way.

Figure 12 for instance shows a casting.

Tube 1 may be enclosed in an outer casing 17 (Figure 13), cylindrical for instance; it being possible to fill the space comprised between the tube and said casing with substance 18 in order to prevent mechanical vibration of the inner tube. According to this method of construction the units might be simply piled against one another in the outer tube without being individually connected with one another.

For any given section, outside diameter and length, calculations show that the total reflecting surface increases in proportion with the number of reflecting units. These consequently can be in the form of grooves 19 (Fig. 14) of suitable section. Their dimensions being so small, these grooves 19 may be cut out of the thickness of the tube itself.

It will even be possible to adopt a helical design 20 (Figure 15), which is easier of execution.

The same result may be obtained (Figure 16) by means of a wire 21 drawn to a suitable section and wound helically inside a smooth tube 1.

In the forms of embodiment hereinabove indicated the reflecting projections are obtained by shaping the internal wall of tube 1. Similar results can be obtained by employing a cylindrical tube and by suitably shaping the surface of a central core 22 (Figures 17 and 18) maintained in position along the axis of tube 1.

Each tube 1 may be constituted by a combination of the different forms of embodiment hereinabove indicated. For instance the tube shown in Figure 19 comprises in the first place small grooves along a certain length $k$—$l$, then larger elements between $l$ and $m$, and finally a corrugated tube from $m$ to $n$ which, because of its elasticity, contributes to the damping of the disturbance.

The damping can be further increased by metallic masses such as turnings, steel-wool, etc., or any other flexible divided substance (rags, tow etc.), introduced into the tube.

For the sake of example Figures 20, 21, 22, 23 show a few forms of application of the invention to industrial apparatuses.

Figure 20 represents a double apparatus fitted to an automobile vehicle. The two dampers 24 and 25 constitute a single tube closed at both ends. The exhaust pipe is connected by pipe 26 to the entrance of damper 24 while the spent gases are evacuated by evacuation pipe 27.

Figure 21 represents the apparatus fitted to a locomotive. The exhaust leads directly to damper 28 while the steam escapes to funnel 30 through tube 29.

Figure 22 represents the application of a triple apparatus 31 to an aeroplane, dampers 32 being located within the thickness of the wing.

Figure 23 represents a double apparatus 33, dampers 34 being positioned along the fuselage.

In order to comply with the practical necessities of fitting onto apparatuses, the dampers may be bent, curved, rolled round themselves, made up of sections connected to one another by smooth elements, etc. Owing to the fact that there is no gaseous current passing along them, the dampers of the apparatuses placed on the exhaust do not become heated, so that it is possible to use parts of the actual construction of the apparatuses as dampers. For instance, in the case of an aeroplane, the dampers may form the fuselage side-members or the wing boom. For motorcycles the tubes of the frame themselves may be transformed into dampers, etc. Such dampers will be connected to the exhaust through simple or multiple separators, similar to those hereinabove described and separating the current disturbance of the burnt gases.

One of the advantages of the invention is that the discharge or burnt gases, when they leave the apparatus, is perfectly regular, thus making it possible to utilize them to actuate various components, a compressor for instance.

Experience has proved that silencers built according to the invention can be efficiently applied as dampers for the noise caused by suction in explosion or internal combustion engines.

The rapid opening and closing of the inlet valves causes disturbances in the inlet manifold absolutely similar to those set up by the exhaust valves. It is from these disturbances that the suction noises originate which noises assume comparatively considerable proportions when engines are under full load.

Figures 25, 26 and 27 show three forms of embodiment of such inlet silencers for motor-car engines.

In Figure 25 the two damping tubes 1 and 1ª are positioned on a common axis and the air supplied to the engine follows the sinuous path shown by arrows *a—b—c*, in the part 40 which is the base forming the separating organ.

In Figure 27 damping tubes 1 and 1ª are bent around into the shape of a snail shell, the air always following sinuous track *a—b—c*.

In the form of embodiment shown in Figure 26 the two damping tubes 1 and 1ª are concentric and are fixed, as in the example shown in Figure 25, to separating organ 40, which is provided with deflecting surfaces which compel the air fed to the engine to follow sinuous path *a—b—c*.

In both cases damping may be obtained on steel-wool or any other suitable substance located in the tubes.

It will be evident that these apparatuses are also capable of being applied to compressors as well as to all other apparatuses utilizing gassy fluids in which disturbances of any nature may occur.

It is to be understood that the methods of embodiment shown in Figures 25, 26 and 27 have been given merely as examples, that the substance with which the various parts constituting the apparatuses may be of any kind (metal, molded or impregnated substances, etc.), and that the number, the shape and the arrangement of the damping tubes, as well as the form given to the separating element, may be varied without going beyond the scope of the following claims.

What I claim is:

1. Apparatus for damping the disturbances propagated in fluids comprising a damping element, a conduit for fluid having an orifice communicating with the interior of the damping element at the front of the latter, said conduit and damping element forming together a continuous chamber, said conduit extending into the interior of the damping element whereby the direction of flow of fluid is reversed at the front of the damping element, the portion of said conduit extending within the damping element being of continuous and constant section to afford a passage between said conduit and said damping element devoid of obstructions to the passage of fluid therethrough.

2. Apparatus for damping the disturbances propagated in fluids comprising a damping element, a conduit for fluid having an orifice communicating with the interior of the damping element at the front of the latter, said conduit and damping element forming together a continuous chamber, said conduit extending into the interior of the damping element whereby the direction of flow of fluid is reversed at the front of the damping element, said damping element extending in the direction of the fluid entering it through said orifice, the portion of said conduit extending within the damping element being of continuous and constant section to afford a passage between said conduit and said damping element devoid of obstructions to the passage of fluid therethrough.

3. Apparatus for damping the disturbances propagated in fluids comprising a damping element, a conduit for fluid having an orifice communicating with the interior of the damping element at the front of the latter, said conduit and damping element forming together a continuous chamber, said conduit extending into the interior of the damping element whereby the direction of flow of fluid is reversed at the front of the damping element, said damping element being constituted by a tubular member having a length substantially greater than the diameter thereof, the rear end of the tubular member being closed and the front end thereof being open, the portion of said conduit extending within the damping element being of continuous and constant section to afford a passage between said conduit and said damping element devoid of obstructions to the passage of fluid therethrough.

4. Apparatus for damping the disturbances propagated in fluids comprising an elongated element having an internal damping chamber therein closed at one end and open at the opposite end, a conduit for fluid having a terminal outlet orifice of less diameter than the internal diameter of said damping element, said outlet orifice being located intermediate the ends of the damping element and adjacent the outlet end of the latter, said conduit being arranged substantially in line with the damping element whereby the fluid is caused to reverse its direction of travel during flow from the conduit to the open end of the damping element, the portion of said conduit extending within the damping element being of continuous and constant section to afford a passage between said conduit and said damping element devoid of obstructions to the passage of fluid therethrough.

5. An apparatus as claimed in claim 4 characterized in that the length of the portion of the damping element between the closed end of the latter and said orifice is substantially greater than the diameter of said element.

6. An apparatus for damping the disturbances propagated in fluids comprising a damping element having an elongated internal chamber closed at one end and open at the other, a conduit for fluid extending into the damping element and having an outlet orifice at the end thereof arranged to direct the fluid entering the damping element in the lengthwise direction and toward the closed end of the latter, the flow of fluid being reversed in passage from said orifice to the open end of the damping element and said orifice being displaced a distance from the closed end of said damping element substantially greater than the diameter of the latter, the portion of said conduit extending within the damping element being of continuous and constant section to afford a passage between said conduit and said damping element devoid of obstructions to the passage of fluid therethrough.

7. Apparatus for damping the disturbances propagated in fluids comprising a damping element, a single conduit for fluid extending within the damping element and being of continuous and constant section to afford a passage between said conduit and damping element devoid of obstructions to the passage of fluid therethrough, said conduit having an orifice communicating with the interior of the damping element at the front of the latter, said conduit and the damping element forming a continuous chamber therebetween and said conduit being disposed to cause the direction of current of fluid to be reversed at the front of the damping element.

ANDRÉ FRANCOIS PAVILLON.